United States Patent [19]
Prats

[11] 3,969,114
[45] July 13, 1976

[54] METHOD FOR MONITORING COPY QUALITY

[75] Inventor: Danny J. Prats, Sodus, N.Y.

[73] Assignee: Xerox Corporation, Stamford, Conn.

[22] Filed: Nov. 29, 1974

[21] Appl. No.: 527,985

Related U.S. Application Data

[62] Division of Ser. No. 382,808, July 26, 1973, Pat. No. 3,894,799.

[52] U.S. Cl. .................. 96/1.4; 96/1 R; 118/7; 118/637; 355/3 R; 356/162; 356/212

[51] Int. Cl.$^2$ .................. G03G 13/14; B05B 5/02; G01B 11/00

[58] Field of Search .................. 96/1 R, 1.4; 118/7, 118/637; 356/212, 162; 355/3

[56] References Cited

UNITED STATES PATENTS

| | | | |
|---|---|---|---|
| 3,094,049 | 6/1963 | Snelling | 355/3 |
| 3,152,012 | 10/1964 | Schaffert | 118/637 |
| 3,348,521 | 10/1967 | Hawk | 118/7 |
| 3,348,523 | 10/1967 | Davidson et al. | 118/7 |
| 3,698,314 | 10/1972 | Grier | 96/1.4 |
| 3,832,055 | 7/1974 | Hamaker | 96/1.4 |
| 3,837,741 | 9/1974 | Spencer | 91/1.4 |
| 3,866,572 | 2/1975 | Gundlach | 96/1.4 |

FOREIGN PATENTS OR APPLICATIONS

| | | | |
|---|---|---|---|
| 1,169,510 | 11/1969 | United Kingdom | 96/1 R |

*Primary Examiner*—Jack P. Brammer

[57] ABSTRACT

A copy quality sensor for a reproduction machine of the type having a photoconductive member on which latent images of the original being copied are electrostatically formed and thereafter developed. The developed latent images are then transferred to copy sheets which may be then fused to provide a permanent image.

The aforesaid transfer of images from the photoconductive member to the copy sheets is effected by a transfer apparatus which includes a transfer roller. A portion of the photoconductive member and transfer roller are reserved for receipt of a test image, which is developed normally on the photoconductive member in addition to the image of the original. The developed test image is transferred directly to the surface of the transfer roller rather than to the copy sheet. A light source is arranged to impinge a beam against the transfer roller opposite the point on which the test image appears, and a photoelectric type pick-up is positioned to receive the beam reflected off of the transfer roller. The pick-up generates an output signal proportional to the intensity of the reflected light which in turn varies with the density of the test image developed on the transfer roller. The output of the pick-up is used to regulate addition of make-up toner to the developer in response to the density of the test image developed.

4 Claims, 3 Drawing Figures

FIG. 2
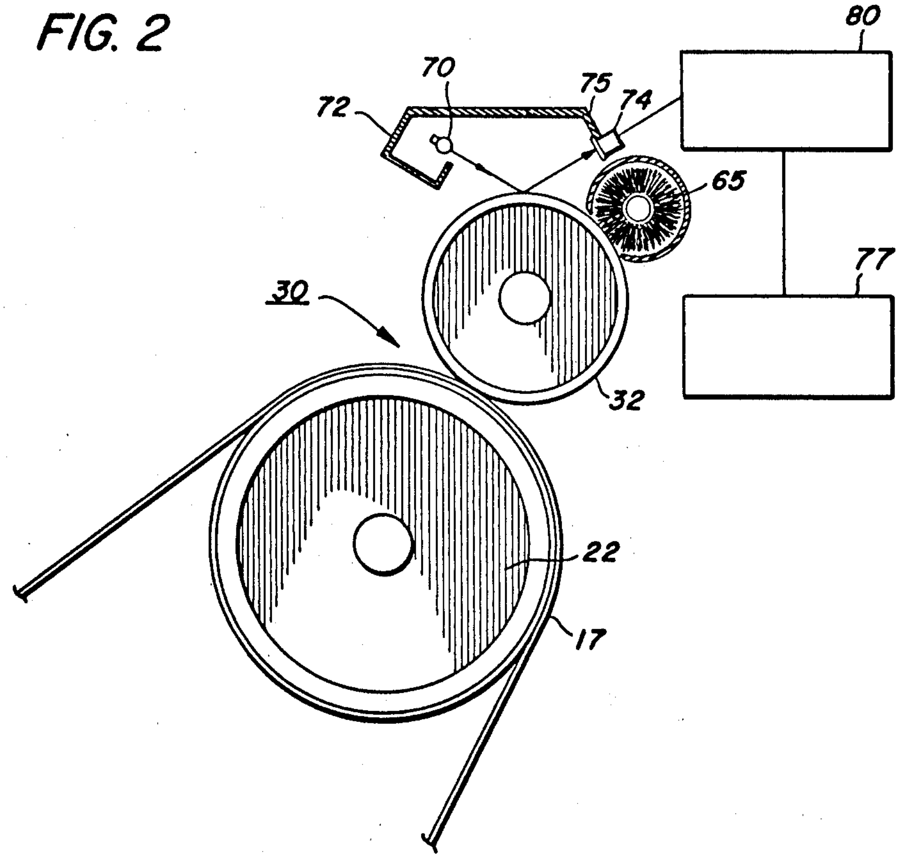
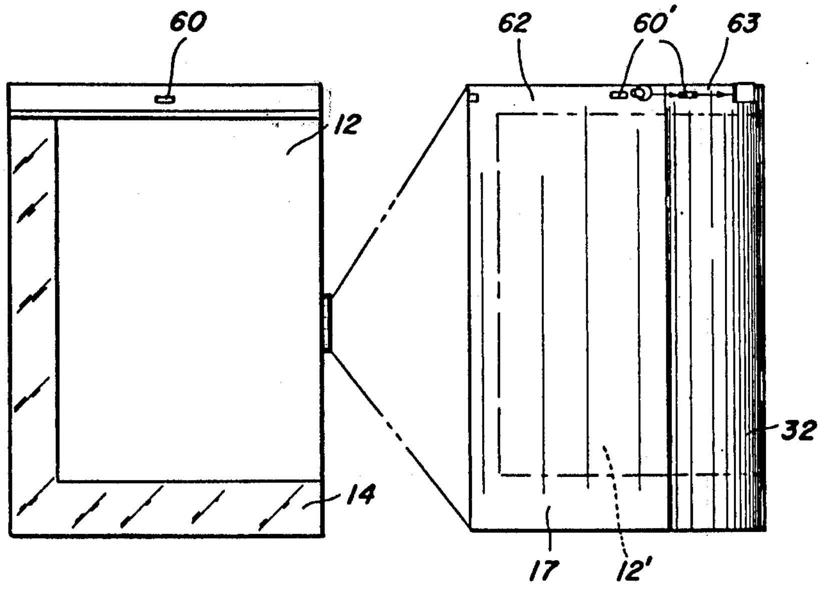
FIG. 3

METHOD FOR MONITORING COPY QUALITY

This is a division of application Ser. No. 382,808, filed July 26, 1973, now U.S. Pat. No. 3,894,799.

This invention relates to a copy quality sensor for reproduction machines, and more particularly, to an improved method of sensing copy quality wherein images developed on the machine transfer roller are monitored.

In reproduction or copying machines, the quality of the reproduction or copy made is an obvious concern, and in this regard efforts are continually expended to assure optimum copy quality. As will be understood by those skilled in this art, one source of copy quality problems arises due to the imaging substance, conventionally called toner, being continuously depleted during the reproduction or copying cycle. In this regard, machines of this nature, provide mechanisms, called developability controls, for replenishing toner, either continuously or in batches from time to time. Such developability controls may, for example, be time oriented, so that after a preset interval of machine operation, a batch of new toner is added. Others may be copy based, wherein an amount of toner is added following production of a certain number of copies.

Still other developability controls respond to the quality of the image being produced by the machine, and for this purpose, employ a light source which impinges a light beam against the photoconductive member together with a light responsive pick-up disposed to receive the light beam reflection from the photoconductive member. In this type of control, the amount of light reflected from the image is held to be representative of the copy quality and in this way indicative of whether or not the supply of toner in the developer is sufficient or has been depleted to a point requiring replacement. However, if the light is directed against an area of the photoconductive member on which images are formed, then the electrostatic forces defining the image may be altered with consequent degradation of the quality of the image produced. If, on the other hand, the light is directed against some portion of the photoconductive member outside of the normal image area, the repeated exposure of this one area of the photoconductive member to the light beam may fatigue the photoconductive member. This may cause the test parameters over an extended period of time to change, and this in turn may render the resultant readings inaccurate and hence unusable for the purpose intended.

It is a principal object of the present invention to provide a new and improved reproduction machine.

It is a further object of the present invention to provide an improved method for monitoring copy quality in a copying machine.

It is an object of the present invention to provide a method of sensing copy density by monitoring images developed directly on the copy transfer roller.

It is an object of the present invention to provide a method of sensing copy density by monitoring test images developed directly on the transfer roller of a reproduction machine.

It is an object of the present invention to provide a method for sensing copy quality wherein a test image developed directly on the transfer roller of the reproduction machine is subjected to a radiant energy beam, and the reflected output therefrom measured to determine copy density.

It is an object of the present invention to provide a method for sensing development efficiency in copiers to control the addition of make-up toner to the copier in response to the quality of a test image developed directly onto the copy transfer roller.

It is an object of the present invention to provide a method of sensing the density of the images being developed in a copier to permit re-supplying of toner to the developer to be controlled to provide optimum copy quality.

The invention relates to the method of determining copy quality in a copying machine of the type having a photoconductive member on which images of the original being copied are developed together with a transfer roller cooperable with the photoconductive member to transfer the developed image to copy sheets, the steps consisting of: developing a second image on the photoconductive member for use in testing image quality, transferring the second image directly to the transfer roller, and looking at the second image on the transfer roller to determine image quality.

Other objects and advantages of the present invention will be apparent from the ensuing description and drawings, in which:

FIG. 2 is an enlarged side view in section showing details of the test image scanning and density sensing mechanism of the present invention; and FIG. 3 is an enlarged top view in section illustrating a portion of the machine photoconductive member and transfer roll bearing the test image of the present invention.

Figure 1:
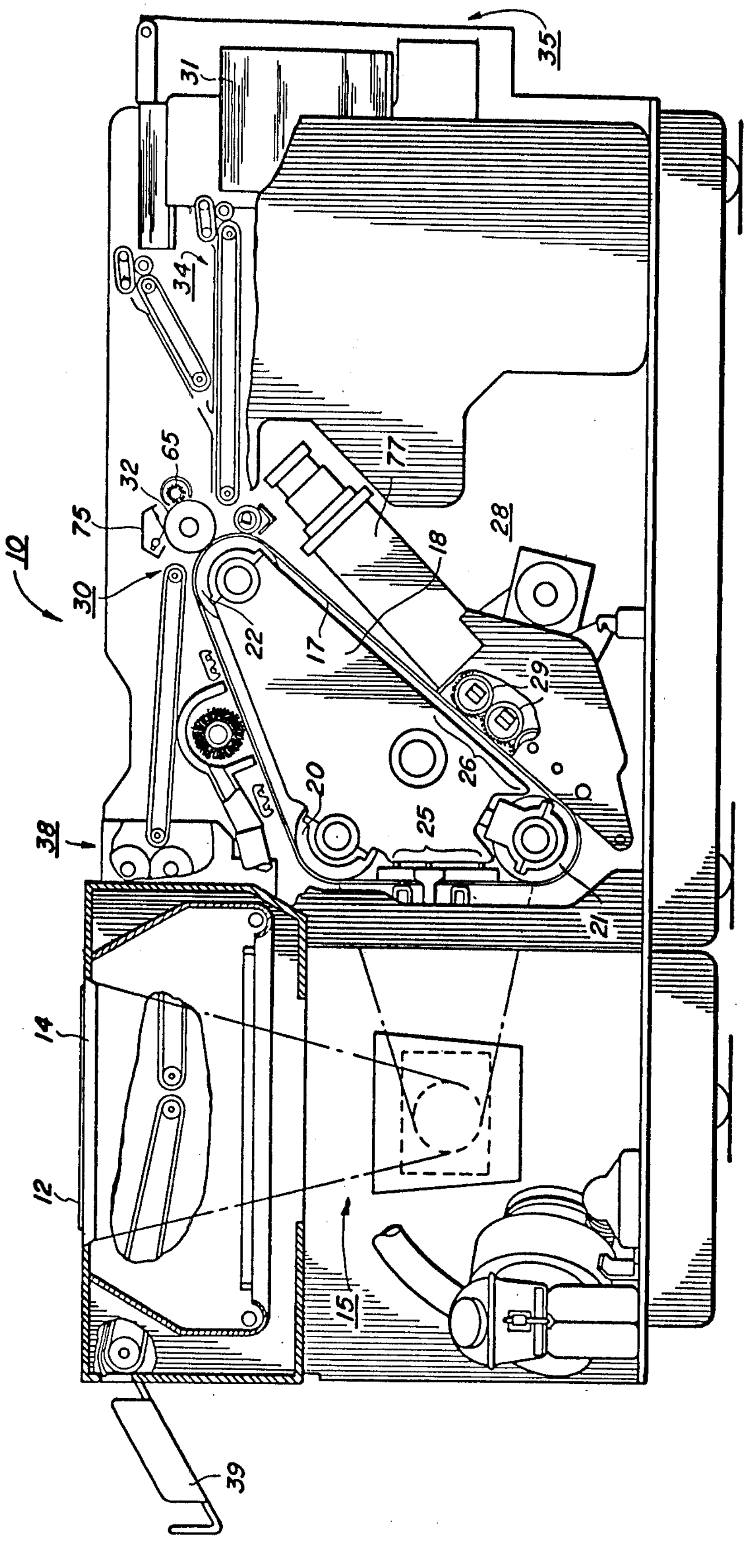
FIG. 1 is a schematic view of an exemplary reproduction or copying machine incorporating the improved copy density sensor of the present invention.

Referring particularly to FIG. 1 of the drawings, an exemplary copier/reproduction machine, designated generally by the numeral 10 and incorporating the copy quality sensor of the present invention, is there shown. As in all electrostatic systems such as the xerographic type machine illustrated, a light image of a document to be reproduced is projected onto the sensitized surface of a xerographic plate to form an electrostatic latent image thereon. Thereafter, the latent image is developed with an oppositely charged developing material to form a xerographic powder or toner image, corresponding to the latent image on the plate surface. The toner image is then electrostatically transferred to a support surface where it is fused by a fusing device so that the toner image is permanently adhered to the support surface.

In machine 10, an original document 12 to be copied is placed upon a transparent support platen 14 fixedly arranged in an illumination assembly generally indicated by the reference numeral 15 and disposed at the left end of the machine. While upon the platen, the document 12 is illuminated, thereby producing image rays corresponding to the informational areas on the original. The image rays are projected by means of an optical system onto the photosensitive surface of a xerographic plate. In the exemplary copier/reproduction machine 10, the xerographic plate is in the form of a flexible photoconductive belt 17 supported in a belt assembly 18.

The support assembly 18 for photoconductive belt 17 includes three rollers 20, 21, and 22 located with parallel axes at approximately the apices of a triangle. The upper roller 22 is rotatably driven by a suitable motor and drive means (not shown) to drive belt 17 in the direction shown by the arrow in FIG. 1. During this movement of the belt, the reflected light image of the original document 12 on platen 14 is flashed upon the photoreceptor surface of belt 17 at an exposure station 25 to produce an electrostatic latent image thereon.

The continued movement of photoconductive belt 17 carries the electrostatic image through a developing station 26 in which there is positioned a developer assembly generally indicated by the reference numeral 28. There, the latent electrostatic image is developed by means of toner through the use of a multiple magnetic brush system 29. Developer assembly 28 includes toner supply section 77 whereat a supply of toner is stored, such toner serving to replenish toner depleted during operation of copier 10.

The developed electrostatic image is carried by belt 17 to the transfer station 30 where the developed image is transferred to a support surface, normally a sheet of copy paper 31, brought forward between transfer roller 32 and belt 17. In order to accomplish transfer of the developed image solely by means of the electrical bias on transfer roller 32, the copy sheet 31 is moved at substantially the same speed as belt 17. A sheet transport mechanism generally indicated at 34 is provided to advance copy sheets 31 from a paper handling mechanism generally indicated by the reference numeral 35 to transfer station 30.

Following transfer, the copy sheet 31 is stripped from belt 17 and conveyed through fuser 38 wherein the toner image is permanently fused or affixed thereto. Following fusing, the finished copy is discharged into output tray 39.

Photoconductive belt 17 comprises a photoconductive layer of selenium, which is the light receiving surface and imaging medium for the apparatus, on a conductive backing. Further details regarding the structure of the belt assembly 12 and its relationship with the machine and support therefor may be found in U.S. Pat. No. 3,730,623, issued May 1, 1973, and assigned to the same assignee.

Referring now to FIGS. 2 and 3 of the drawings, platen 14 is provided with a test pattern or image 60 arranged to one side thereof and located outside the normal position occupied by the largest document 12 to be copied. Preferably, test image 60 is permanently fixed to platen 14 and may, in fact, be formed integral with the platen material, which is normally glass. Test image 60 may be generated in other ways as by an overlay pattern resting on platen 14 or a discoloration on the inside surface of the platen cover (not shown). In the case of the latter, it will be understood that the underside of the platen cover is normally formed from a reflective white material, conventionally termed "xerographic white", to avoid generation of spurious and unwanted images in the areas outside the perimeter of a document being copied but within the exposure field of the copying machine.

While test image 60 is illustrated as comprising a small rectangular path, other configurations may be envisioned. One such configuration comprises a line or bar type image.

As described heretofore in connection with reproduction of the document 12, exposure of the test image 60 on the charged photoconductive member 17 at exposure station 25 generates a corresponding electrostatic latent image thereof on the photoconductive member 17 which on movement of member 17 into operative juxtaposition with magnetic developing brushes 29 at developer station 28 is developed by the marking material, toner. It is understood that since the test image 60 on platen 14 is outside the normal imaging area of the document being copied, the image 60′ thereof generated on member 17 is adjacent to but outside the document image electrostatically formed and developed on member 17. It should be further understood that member 17 and transfer roller 32 are of a width sufficient to provide an unused area to accommodate the test image 60′, such area being identified herein as the strip-like margin portions, 62, 63 on photoconductive member 17 and transfer roller 32, respectively.

Following development, the developed image 12′ of the document 12 on member 17 is transferred at transfer station to the support material such as copy sheets 31 as described previously. At the same time, the test image 60′ developed on the photoconductive member 17 adjoining the image 12′ is transferred directly to the surface of transfer roller 32. This occurs since the test image 60′, which as described is outside the boundary of the document image 12′ is also outside or beyond the edge of the copy sheets 31, it being appreciated that copy sheets 31 are normally of a size approximating that of the document 12. Under these circumstances test image 60′ is transferred from photoconductive member 17 directly onto transfer roller 32, bypassing copy sheets 31.

A source of radiant energy in the form of light 70 is supported from a frame member 72 adjoining transfer roller 32. Frame member 72 is itself suitably supported within copy machine 10 opposite the strip-like margin 63 of transfer roller 32 and in an area between the transfer nip formed by roller 32 and photoconductive member 17, and the point where cleaning brush 65 contacts roller 32. Light 70 is oriented such that the light beam emitted therefrom impinges on margin 63 of transfer roller 32 at preselected angle. Frame 72, which is of generally inverted U-shape when seen in cross section, carries a light responsive pick-up, i.e. photocell 74, adjacent the opposite end 75 thereof, photocell 74 being disposed to receive the light beam from light 70 reflected off of the surface of transfer rollers 32.

The output of photocell 74 is preferably utilized to regulate the flow of toner from toner supply 77 to the developer sump opposite magnetic brushes 29, the signal from photocell 74 being fed to a suitable control circuit 80 controlling operation of the developer toner dispensing apparatus. One form of toner dispensing apparatus and control is found in U.S. Pat. No. 3,348,523, issued Oct. 24, 1967, and assigned to the same assignee.

It will be understood that control circuit 80 may incorporate means of the type disclosed in U.S. Pat. No. 3,348,523 to distinguish between test image areas and non-test image areas, that is, the area between test images 60 on transfer roller 32 or some equivalent thereof. Where the test image 60 comprises a continuous image such as a line, the aforementioned means may be modified or, in some cases, omitted.

While the invention has been described with reference to the structure disclosed, it is not confined to the details set forth, but is intended to cover such modifications or changes as may come within the scope of the following claims.

What is claimed is:

1. The method of operating a copying machine of the type having a photoconductive member in which the images of the original being copied are developed, a transfer roller cooperable with the photoconductive member to transfer the developed image to copy sheets, and feeding means for feeding copy sheets along a preset path to said transfer roller for transfer of the developed images thereto, comprising the steps of:

developing a test image on said photoconductive member for use in testing developer activity, transferring the test image directly to the transfer roller, outside said copy sheet preset path and monitoring the test image on the transfer roller to determine image quality.

2. The method according to claim 1 including the step of cleaning said transfer roller to remove traces of said test image.

3. The method according to claim 1 including the step of shining a light beam of predetermined intensity against said transfer roller and onto said test image, and monitoring the reflected intensity of said beam to determine the condition of said test image.

4. The steps according to claim 3 including the step of regulating the addition of developer to the copy machine developing apparatus in accordance with the reflected intensity from said light beam.

* * * * *